United States Patent
Kuki et al.

(10) Patent No.: US 7,429,285 B2
(45) Date of Patent: Sep. 30, 2008

(54) HONEYCOMB STRUCTURE AND METHOD OF MANUFACTURING THE SAME

(75) Inventors: Tatsuyuki Kuki, Kasugai (JP); Ryuji Kai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 488 days.

(21) Appl. No.: 11/083,993

(22) Filed: Mar. 21, 2005

(65) Prior Publication Data

US 2005/0210848 A1 Sep. 29, 2005

(30) Foreign Application Priority Data

Mar. 24, 2004 (JP) .............................. 2004-086086

(51) Int. Cl.
*B01D 24/00* (2006.01)
*B01D 39/14* (2006.01)
*B01D 39/00* (2006.01)
*B01D 50/00* (2006.01)

(52) U.S. Cl. .............................. 55/523; 55/282; 55/524; 422/177

(58) Field of Classification Search ................. 422/177; 55/523, 282, 524
See application file for complete search history.

(56) References Cited

U.S. PATENT DOCUMENTS

| | | | | |
|---|---|---|---|---|
| 4,329,162 A | * | 5/1982 | Pitcher, Jr. .................. | 55/523 |
| 4,415,344 A | * | 11/1983 | Frost et al. .................. | 55/523 |
| 5,194,078 A | * | 3/1993 | Yonemura et al. ............ | 55/466 |
| 5,514,446 A | * | 5/1996 | Machida et al. ............. | 428/116 |
| 5,720,787 A | * | 2/1998 | Kasai et al. ................. | 55/282 |
| 6,581,589 B1 | * | 6/2003 | Fent et al. ................... | 126/617 |
| 2003/0093982 A1 | | 5/2003 | Suwabe et al. | |
| 2004/0065068 A1 | * | 4/2004 | Otsubo et al. ................ | 55/523 |
| 2004/0071932 A1 | | 4/2004 | Ishihara et al. | |
| 2004/0088959 A1 | | 5/2004 | Saito et al. | |
| 2005/0095179 A1 | | 5/2005 | Kasai et al. | |

FOREIGN PATENT DOCUMENTS

| | | |
|---|---|---|
| DE | 103 47 746 A1 | 6/2004 |
| EP | 1 293 241 A2 | 2/2003 |
| EP | 1 484 100 A1 | 12/2004 |
| FR | 2 845 727 A1 | 4/2004 |
| GB | 2 071 640 A | 9/1981 |
| JP | A 58-45715 | 3/1983 |
| JP | U-62-105320 | 7/1987 |

(Continued)

*Primary Examiner*—Walter D. Griffin
*Assistant Examiner*—Amber Miller Harris
(74) *Attorney, Agent, or Firm*—Oliff & Berridge, PLC

(57) ABSTRACT

A honeycomb structure 20 includes a cell structure 10 having a plurality of cells 9 communicating between two open ends being partitioned and defined by porous partition walls 7, an outer wall 30 disposed at the periphery of the cell structure 10, and first plugging portions 25 disposed in a checkered flag pattern at one end and the other end of the cell structure 10 by plugging alternately either of the two open ends of the cells, a fluid to be flown from one of the open ends of each of the cells 9 being capable of penetrating the porous partition walls 7 and flowing out from the other open end 5 of each of the cells 9 as a filtered fluid. The honeycomb structure 20 includes the first plugging portions 25 having been fired after plugging, and second plugging portions 26 having been unfired even after plugging.

20 Claims, 11 Drawing Sheets

FOREIGN PATENT DOCUMENTS

| | | |
|---|---|---|
| JP | U-64-12614 | 1/1989 |
| JP | A-05-118211 | 5/1993 |
| JP | A-08-281034 | 10/1996 |
| JP | A 2003-126629 | 5/2003 |
| JP | A-2004-051384 | 2/2004 |
| WO | WO 03/076047 A1 | 9/2003 |

* cited by examiner

HONEYCOMB STRUCTURE AND METHOD OF MANUFACTURING THE SAME

BACKGROUND OF THE INVENTION

1. Field of the Invention

The present invention relates to a honeycomb structure used for a filter for trapping particles contained in exhaust gas from an internal combustion engine, boiler, or the like, and a method of manufacturing the same.

2. Description of Related Art

Since a large amount of particulates (particulate matter) containing carbon as the major component, which may cause environmental pollution, is contained in exhaust gas discharged from an internal combustion engine such as a diesel engine, a filter (diesel particulate filter (DPF)) for trapping particulates may be provided to the exhaust system of an internal combustion engine.

As a filter used for such a purpose, as shown in FIGS. 10(a) and 10(b), a honeycomb structure 1 having a plurality of cells (through channels) 9 partitioned by porous partition walls 7 and formed through the honeycomb structure 1 in the axial direction is generally used, in which one end of predetermined cells 9a is plugged with a plugging portion 11 and the remaining cells 9b are plugged at the other end opposite to that of the predetermined cells 9a, alternately.

Exhaust gas flows into a filter including the honeycomb structure 1 from one end face 3 and is discharged from the other end face 5 after removal of particulates contained in the gas. In more detail, exhaust gas flows into the cells 9b, of which the end is not plugged at one end face 3 of the filter and is plugged at the other end face 5, passes through the porous partition walls 7, moves to the cells 9a, of which the end is plugged at the end face 3 and is not plugged at the other end face 5, and is discharged from the cells 9a. In this case, the partition walls 7 function as filtration layers, and particulates contained in the gas are trapped by and deposited on the partition walls 7.

After using the filter for a predetermined period of time, particulates deposited on the partition walls of the filter are heated and removed through combustion by supplying electricity to an electric heater provided thereto or the like.

However, the temperature of the peripheral portion of the filter in the diametrical direction tends to be decreased due to a small amount of exhaust gas passing through those areas and a large degree of heat radiation to the atmosphere. Therefore, since particulates remain unburned in this area after regeneration of the filter due to insufficient oxidation and combustion of particulates, the partition walls of the filter are clogged. Moreover, in the case where unburned particulates are suddenly combusted during particulate combustion, the temperature of this area is significantly increased, whereby the filter tends to be eroded or damaged (due to thermal stress).

In order to prevent occurrence of uneven deposition of particulates inside the filter, a honeycomb structure of which the peripheral portion in the diametrical direction of the filter is plugged has been mainly used, for example. As shown in FIGS. 8(a) to (d), a method of manufacturing such a honeycomb structure includes (1) providing plugging portions to a honeycomb formed product, in which a plurality of cells communicating between two open ends are partitioned and formed by porous partition walls, in a checkered flag pattern at one end and the other end of the honeycomb formed product alternately so that either of the two open ends of each cell is plugged with a plugging material alternately, and firing the honeycomb formed product to obtain a honeycomb structure 40, (2) plugging the peripheral portion of the resulting honeycomb structure 40 in the diametrical direction with a plugging material in a predetermined range, and firing the honeycomb structure 40 to obtain a peripherally-plugged honeycomb structure 42, (3) grinding the periphery portions of the resulting honeycomb structure 42 in a predetermined dimension, and (4) coating thus ground honeycomb structure 42 with a coating material (material containing ceramics) 46 in order to form a protective layer on the periphery of the honeycomb structure 42, and drying the coating material to obtain a honeycomb structure 50.

However, since it is difficult to align the above honeycomb structure during peripheral grinding, the peripheral portion of the honeycomb structure in the diametrical direction cannot be formed to conform to the design. In recent years, an improvement of fuel consumption has been demanded. This demand may be satisfied by reducing the pressure loss by increasing the porosity of the filter. However, if the porosity is increased, the cells as fluid channels may be deformed when forming the honeycomb structure, or the degree of roundness of the outer diameter is decreased, whereby it becomes more difficult to align the honeycomb structure during peripheral grinding. Therefore, the yield is decreased when manufacturing a honeycomb structure peripherally plugged with a plugging material as in a conventional honeycomb structure. Moreover, since it is necessary to perform the firing step at least twice, the manufacturing cost is increased.

SUMMARY OF THE INVENTION

The present invention has been achieved in view of the above-described problems of the related art. An objective of the present invention is to provide a honeycomb structure and a method of manufacturing the same which can significantly improve the yield of the honeycomb structure due to the capability of plugging the peripheral portion after the peripheral portion of the honeycomb structure in the diametrical direction is determined, and can significantly reduce the manufacturing cost due to the formation of the peripheral plugging portions of the honeycomb structure in the diametrical direction without firing.

We have found that the above-mentioned objectives can be attained by the present inventive honeycomb structure and a method of manufacturing the same.

[1] A honeycomb structure, comprising: a cell structure having a plurality of cells communicating between two open ends and being formed by having been partitioned by porous partition walls; an outer wall provided at a periphery of the cell structure; and first plugging portions provided in a checkered flag pattern at one end and the other end of the cell structure to plug either of the two open ends of the cells alternately; through which a fluid flowing from open ends thereof and penetrating the porous partition walls into the neighboring cells whose other ends are open and flowing out from the other open ends as a filtered fluid; and second plugging portions; the first plugging portions being fired after plugging but the second plugging portions being unfired even after plugging.

[2] The honeycomb structure as defined in [1], wherein the second plugging portions are provided in such manner that a part of the face of at least one end out of two open ends of the cells located at an outermost peripheral portion of the structure and those located inwardly within a predetermined number counting from the outermost peripheral cell, and to which the first plugging portions are not provided is plugged thereby.

[3] The honeycomb structure as defined in [2], wherein a distance from the outermost peripheral cell to a peripheral cell to which the second plugging portions are formed is 2 to 10% of a hydraulic diameter of the honeycomb structure defined by the following equation (1):

$$HD=4S/L \qquad (1)$$

wherein HD means hydraulic diameter, S means cross-sectional area of honeycomb structure perpendicular to gas passage direction, and L means circumference of cross section of honeycomb structure perpendicular to gas passage direction.

[4] The honeycomb structure as defined in any of [1] to [3], wherein a length of the second plugging portion being formed on one end face of the cell among two ends of the structure from its end face to a deepest end of the plugging is shorter than that of the first plugging portion. Hereinafter, as far as the term "length" is concerned with the plugged portions, it means the distance of the plugged portion(s) from the end face of the cell plugged thereby to the deepest end of the formed plugged portion(s) into the cell.

[5] The honeycomb structure as defined in [4], wherein the length of the second plugging portion is 0.5 to 3.0 mm.

[6] The honeycomb structure as defined in any of [1] to [5], wherein a length of the second plugging portion being formed on other end face of the cell among two ends of the structure from its end face is longer than that of the first plugging portion.

[7] The honeycomb structure as defined in claim [6], wherein the length of the second plugging portion is 5.0 mm or more.

[8] The honeycomb structure as defined in any of [1] to [7], wherein at least one of the outer wall and the second plugging portion of the honeycomb structure is formed of a material containing ceramics.

[9] The honeycomb structure as defined in any of [1] to [8], comprising a protrusion formed of a material containing ceramics and peripherally provided to the honeycomb structure on a position of at least one of end faces extending from the outer wall to the peripheral cells of the honeycomb structure.

[10] The honeycomb structure as defined in [9], wherein a vertical cross-sectional shape of the protrusion is a tapered shape or a round head shape.

The honeycomb structures as defined in [1] to [10] are preferably formed of a material containing ceramics including at least one material selected from the group consisting of cordierite particles, ceramic fibers and an amorphous oxide matrix present between cordierite particles and/or ceramic fibers. The amorphous oxide matrix is preferably a matrix formed of colloidal silica or colloidal alumina.

[11] The honeycomb structure as defined in any of [1] to [10], wherein the second plugging portions are mainly formed in ranges of 10 to 80°, 100 to 170°, 190 to 260°, and 280 to 350° based on an axis which passes through a center of the honeycomb structure and intersects the partition walls at right angles.

[12] The honeycomb structure as defined in any of [1] to [11], wherein a cross-sectional shape of the cell is a triangle, quadrangle, hexagon, octagon, or circle, or a shape obtained by combining these shapes.

The honeycomb structures as defined in [1] to [12] may be used as a filter in which partition walls have filtration capability and which traps and removes particulates contained in dust-containing fluid such as exhaust gas from an internal combustion engine.

[13] The honeycomb structure as defined in any of [1] to [12] which includes one material selected from the group consisting of cordierite, silicon carbide, silicon nitride, alumina, mullite, aluminum titanate, and LAS as a main crystal phase.

[14] A method of manufacturing a honeycomb structure which comprises the steps of:

providing a first plugging portion to a honeycomb formed product, in which a plurality of cells communicating between two open ends are partitioned and formed by porous partition walls, in a checkered flag pattern at one end and the other end of the honeycomb formed product so that either of the two open ends of each of the cells is plugged with a plugging material alternately, firing the honeycomb formed product to obtain a honeycomb structure; grinding a periphery of the honeycomb structure to a predetermined outer dimension to form grooves open to the outside and extending in the axial direction by removing an outer portion of partition walls of the outermost peripheral cells which faces to outside;

filling at least thus formed grooves of the honeycomb structure with a material containing ceramics to form an outer wall to have a predetermined outer dimension; and filling at least a part of the open ends of the cells located at an outermost peripheral portion of the structure and located inwardly from the outermost peripheral cell at a position within a predetermined number of cells counting therefrom, and to which the first plugging portions are not provided is plugged thereby, and drying the material used for plugging to form a second plugging portion; said second plugging portion being unfired.

[15] The method of manufacturing a honeycomb structure as defined in [14], wherein the material containing at least one ceramic material selected from the group consisting of cordierite particles, ceramic fibers and an amorphous oxide matrix present between cordierite particles and/or ceramic fibers.

[16] The method of manufacturing a honeycomb structure as defined in [15], wherein the amorphous oxide matrix is a matrix formed of colloidal silica or colloidal alumina.

[17] The method of manufacturing a honeycomb structure as defined in any of [14] to [16], wherein the honeycomb structure includes one material selected from the group consisting of cordierite, silicon carbide, silicon nitride, alumina, mullite, aluminum titanate, and LAS as a main crystal phase.

A honeycomb structure having outer wall and second plugging portion both of which have been made of the same material may be obtainable in the case of the methods as defined in [14] to [17].

According to the honeycomb structure and the method of manufacturing the same of the present invention, since the peripheral portion of the structure can be plugged after the peripheral portion of the honeycomb structure in the diametrical direction is determined, the yield of the honeycomb structure is significantly improved. Moreover, since the peripheral portion of the honeycomb structure in the diametrical direction can be plugged at a later stage of the production and the outer wall and the second plugging portion of the honeycomb structure can be formed without firing, the manufacturing cost can be significantly reduced.

BRIEF DESCRIPTION OF THE DRAWINGS

FIG. 1 shows a typical example of a honeycomb structure of the present invention, wherein

FIG. 10 is a schematic explanatory diagram showing a basic structure of a honeycomb structure conventionally used as a filter, wherein

DETAILED DESCRIPTION OF THE EMBODIMENT

Figure 1A:
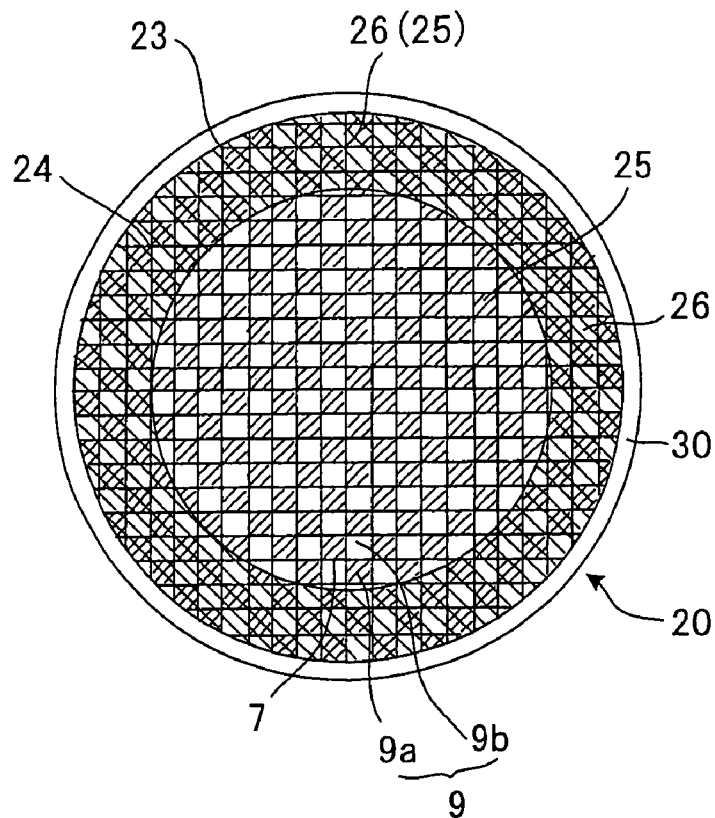
FIG. 1(a) is a front view and FIG. 1(b) is an explanatory diagram of FIG. 1(a).
Figure 1B:
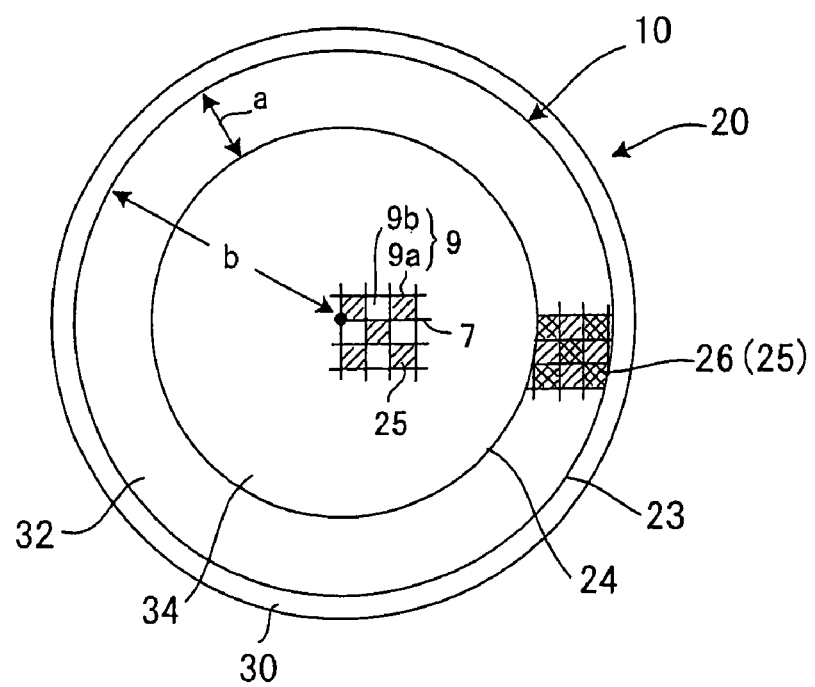
Figure 2:
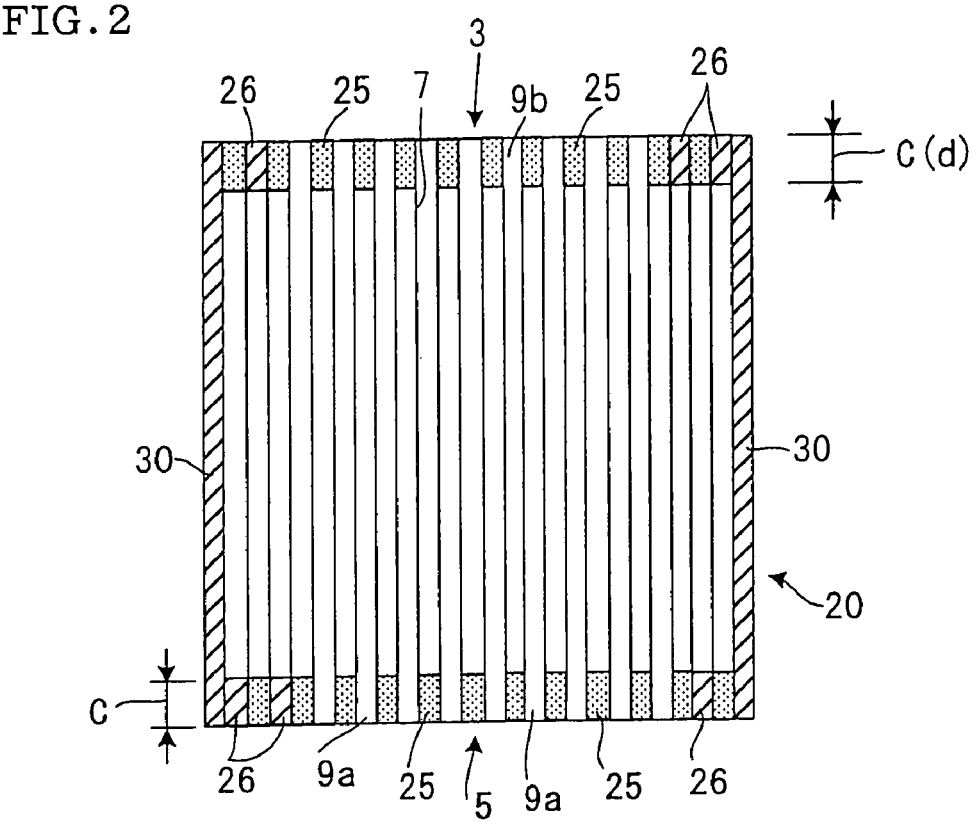
FIG. 2 is a vertical cross-sectional view showing an example of the honeycomb structure of the present invention.

FIG. 1 shows a typical example of a honeycomb structure of the present invention, wherein FIG. 1(a) is a front view and FIG. 1(b) is an explanatory diagram of (a), and FIGS. 2 to 5 are vertical cross-sectional views showing examples of the honeycomb structure of the present invention. As shown in FIGS. 1(a), 1(b), and 2, a honeycomb structure 20 according to the present invention includes a cell structure 10 in which a plurality of cells 9 communicating between two open ends 3 and 5 are partitioned and formed by porous partition walls 7, an outer wall 30 disposed at the periphery of the cell structure 10, and first plugging portions 25 provided in a checkered flag pattern at one end and the other end of the cell structure 10 so as to plug either of the two open ends 3 and 5 of each of the cells 9a and 9b, alternately, a fluid which has flowed from the open end 3 of each of the cells being capable of penetrating the porous partition walls 7 and flowing out from the open end 5 of each of the cells as a filtered fluid, the honeycomb structure 20 further including second plugging portions 26 provided to, among the two open ends 3 and 5 of outermost peripheral cells 23 located at the outermost periphery of the cell structure 10 and peripheral cells 24 located inward from the outermost peripheral cells 23 within a range of a predetermined number of cells, at least a part of the open ends 3 and 5 to which the first plugging portion 25 is not provided, the second plugging portions 26 being formed of a material containing ceramics (coating material) capable of plugging the outermost peripheral cells 23 and the peripheral cells 24 merely by subjected to drying without firing.

Specifically, the principal feature of the honeycomb structure of the present invention is that, as shown in FIG. 1(b), the honeycomb structure is formed by a filter section 34 including the first plugging portions 25 disposed in a checkered flag pattern at one end and the other end of the cell structure 10 alternately, a peripheral plugging portion 32 disposed at the periphery of the filter section 34 and obtained by plugging the remaining open ends 3 and 5 of the filter section 34 using the second plugging portions 26, and the outer wall 30 disposed around the peripheral plugging portion 32, the peripheral plugging portion 32 being formed by drying a material containing ceramics (coating material) without firing the material containing ceramics. In the present invention, since the outer wall 30 and the peripheral plugging portion 32 are formed of the same material, the peripheral plugging portion 32 can be formed at the same time as the outer wall 30, whereby the production efficiency is increased.

According to the honeycomb structure of the present invention, since the peripheral portion can be plugged after the peripheral portion of the honeycomb structure in the diametrical direction is determined, the yield of the honeycomb structure is significantly improved. Moreover, since the peripheral portion of the honeycomb structure in the diametrical direction can be plugged at a later stage of the production and the outer wall and the second plugging portion of the honeycomb structure can be formed without firing, the manufacturing cost can be significantly reduced.

The honeycomb structure of the present invention prevents erosion of or damage to the honeycomb structure due to thermal stress during combustion of particulates, enables effective reinforcement of the honeycomb structure, and improves separation resistance of the outer wall provided for reinforcement, thereby improving heat resistance and thermal shock resistance.

The honeycomb structure of the present invention prevents particulates deposited in the peripheral portion provided with the second plugging portion from remaining unburned during combustion of particulates, and prevents deposition of particulates in the peripheral portion.

In the honeycomb structure of the present invention, as shown in FIG. 1(b), it is preferable that a distance "a" from the outermost peripheral cell 23 to the peripheral cell 24 be 2 to 10% of the hydraulic diameter of the honeycomb structure defined by the following equation (1):

$$HD = 4S/L \tag{1}$$

wherein HD means hydraulic diameter, S means cross-sectional area of honeycomb structure perpendicular to gas passage direction, and L means circumference of cross section of honeycomb structure perpendicular to gas passage direction.

If the distance "a" is 2% or less of the hydraulic diameter, a sufficient thermal insulation effect on the peripheral portion cannot be obtained. If the distance "a" exceeds 10% of the hydraulic diameter, since the initial pressure loss becomes twice or more and the pressure loss in a state in which 5 g/L of particulates are deposited becomes 1.5 times or more, fuel consumption is increased.

Figure 3:
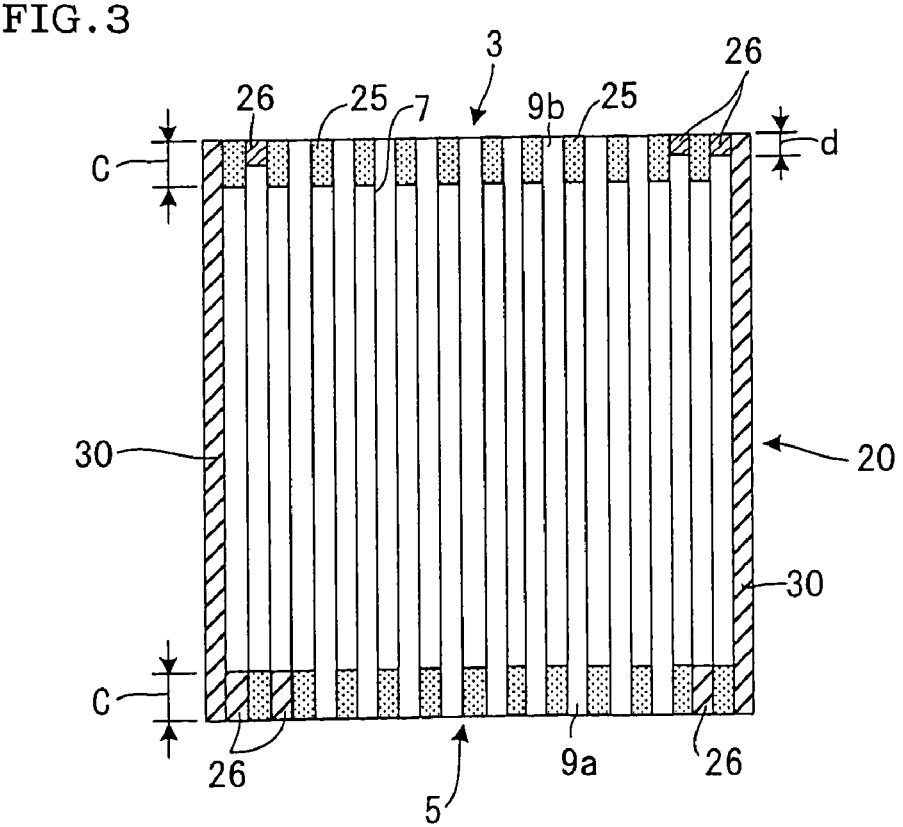
FIG. 3 is a vertical cross-sectional view showing another example of the honeycomb structure of the present invention.

In the honeycomb structure of the present invention, as shown in FIG. 2, a length "c" of the second plugging material 26 from the open ends 3 and 5 of the cells of the honeycomb structure 20 to the deepest end thereof may be the same as a length "d" of the first plugging material 25. However, it is preferable that the length "d" of the second plugging portion 26 formed from the cell open end face at the fluid inflow end 3 of the honeycomb structure 20 be shorter than the length "c" of the first plugging portion 25, as shown in FIG. 3.

In the peripheral portion of the honeycomb structure in the diametrical direction, since a large number of particulates remain unburned due to a small amount of exhaust gas passing through those areas and a large degree of heat radiation to the atmosphere, clogging tends to occur. However, since the heat capacity is reduced to allow an increase in temperature to easily occur by making the length "d" of the second plugging portion 26 shorter than the length "c" of the first plugging portion 25, oxidation and combustion of particulates can be favorably performed. Therefore, particulates rarely remain unburned after filter regeneration, and the partition walls of the filter are not clogged. The length "d" of the second plugging portion is preferably 0.5 to 3.0 mm.

Figure 4:
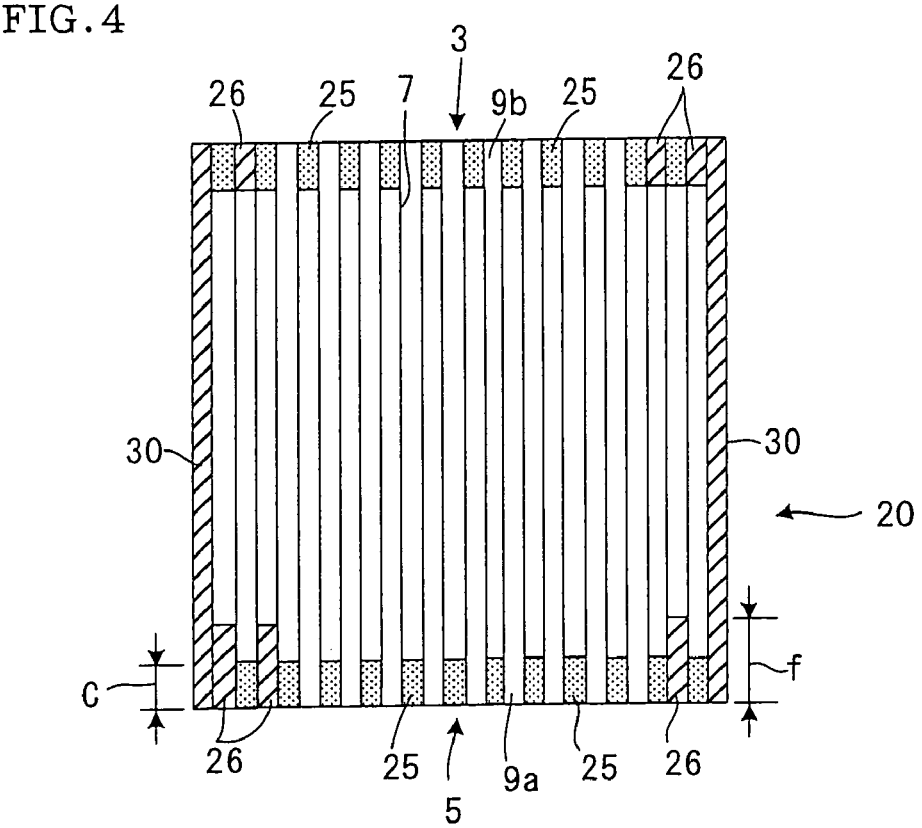
FIG. 4 is a vertical cross-sectional view showing still another example of the honeycomb structure of the present invention.

In the honeycomb structure of the present invention, as shown in FIG. 4, it is preferable that a length "f" of the second plugging portion 26 from the cell open end face at the other end face 5 of the honeycomb structure 20 be longer than the length "c" of the first plugging portion 25.

Since the particulate combustion heat is accumulated at the other end face 5 of the honeycomb structure when regenerating the honeycomb structure by combusting particulates, the temperature of the other end face 5 becomes highest and erosion easily occurs. However, an increase in the temperature of the other end face 5 is reduced by locally increasing the heat capacity by increasing the length of the second plugging portion 26 provided at the other end face 5, whereby occurrence of erosion of the filter is prevented. The length "f" of the second plugging portion is preferably 5.0 mm or more.

Figure 5:
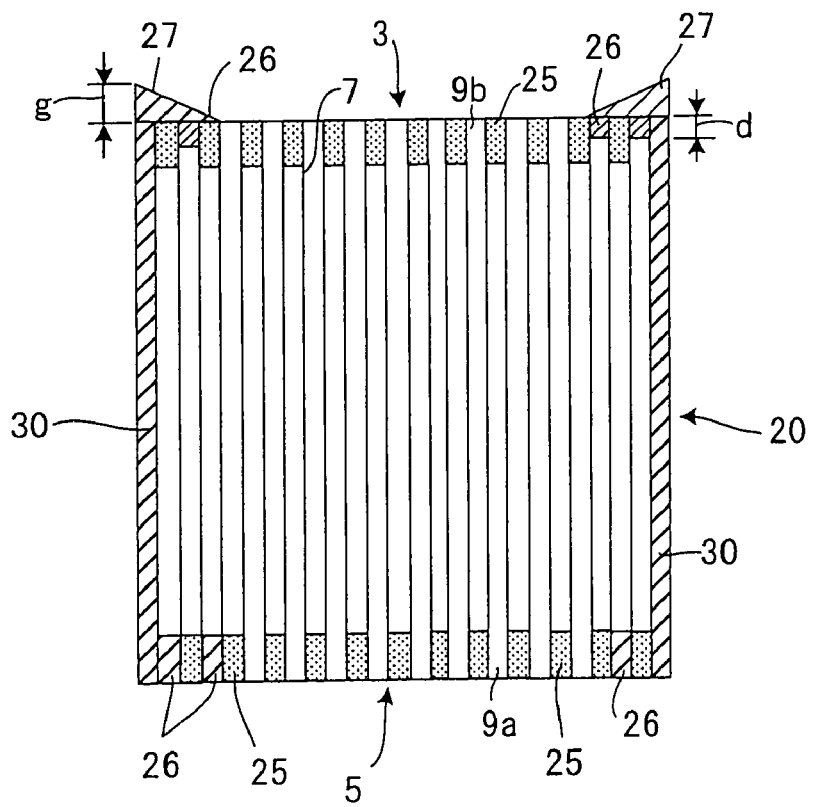
FIG. 5 is a vertical cross-sectional view showing still another example of the honeycomb structure of the present invention.

In the honeycomb structure of the present invention, as shown in FIG. 5, it is preferable that a protrusion 27 formed of a material containing ceramics be peripherally provided to the honeycomb structure from the outer wall 30 of the honeycomb structure 20 to the end faces of the peripheral cells 24 in order to prevent deposition of soot in the peripheral portion, and it is still more preferable that the vertical cross-sectional shape of the protrusion 27 be a tapered shape (see FIG. 5) or a round head shape (not shown). A height "g" of the protrusion 27 is preferably 0.5 mm or more (still more preferably 1.0 to 10.0 mm).

Figure 6:
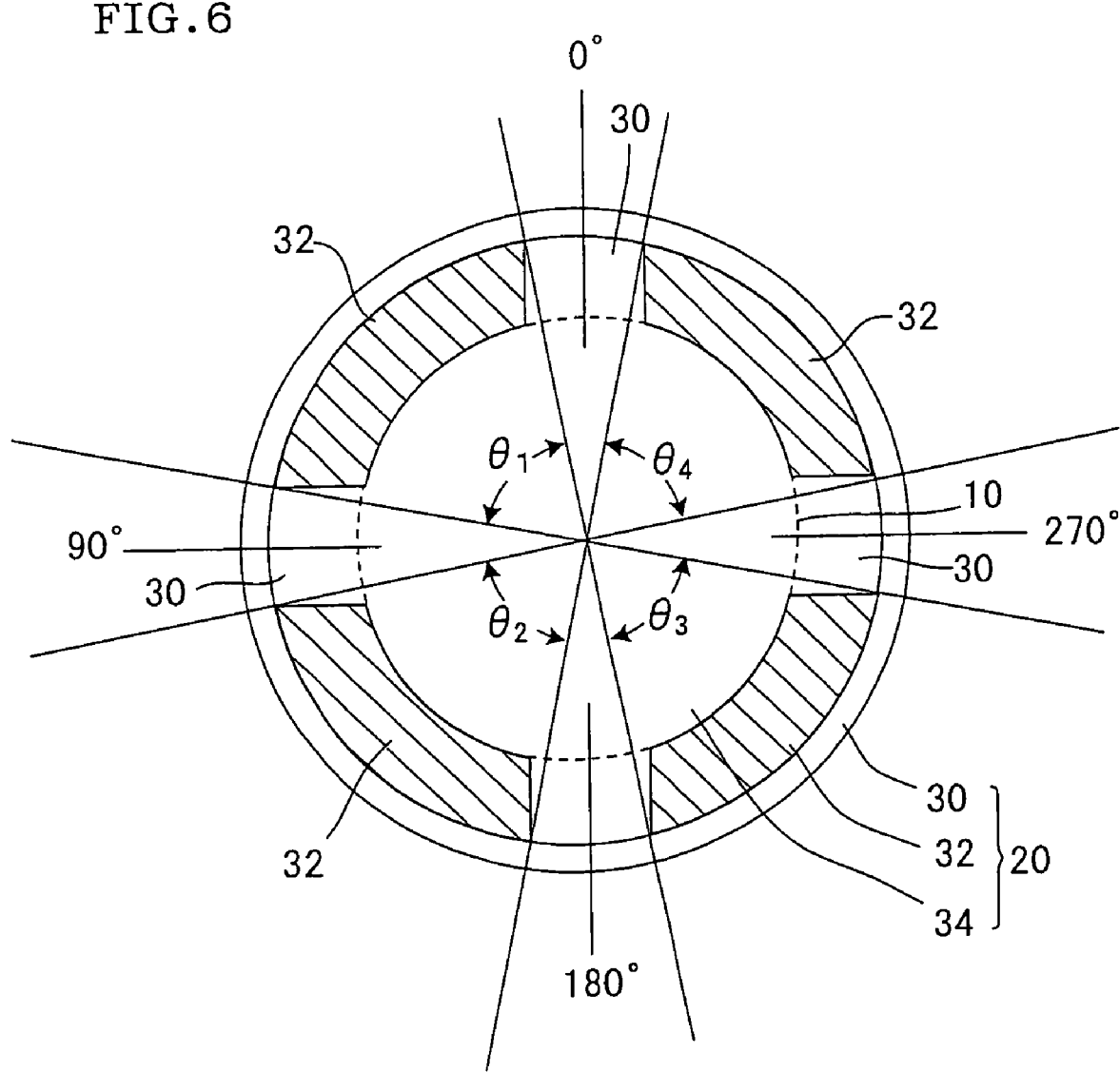
FIG. 6 is an explanatory diagram showing yet another example of the honeycomb structure of the present invention.
Figure 7:
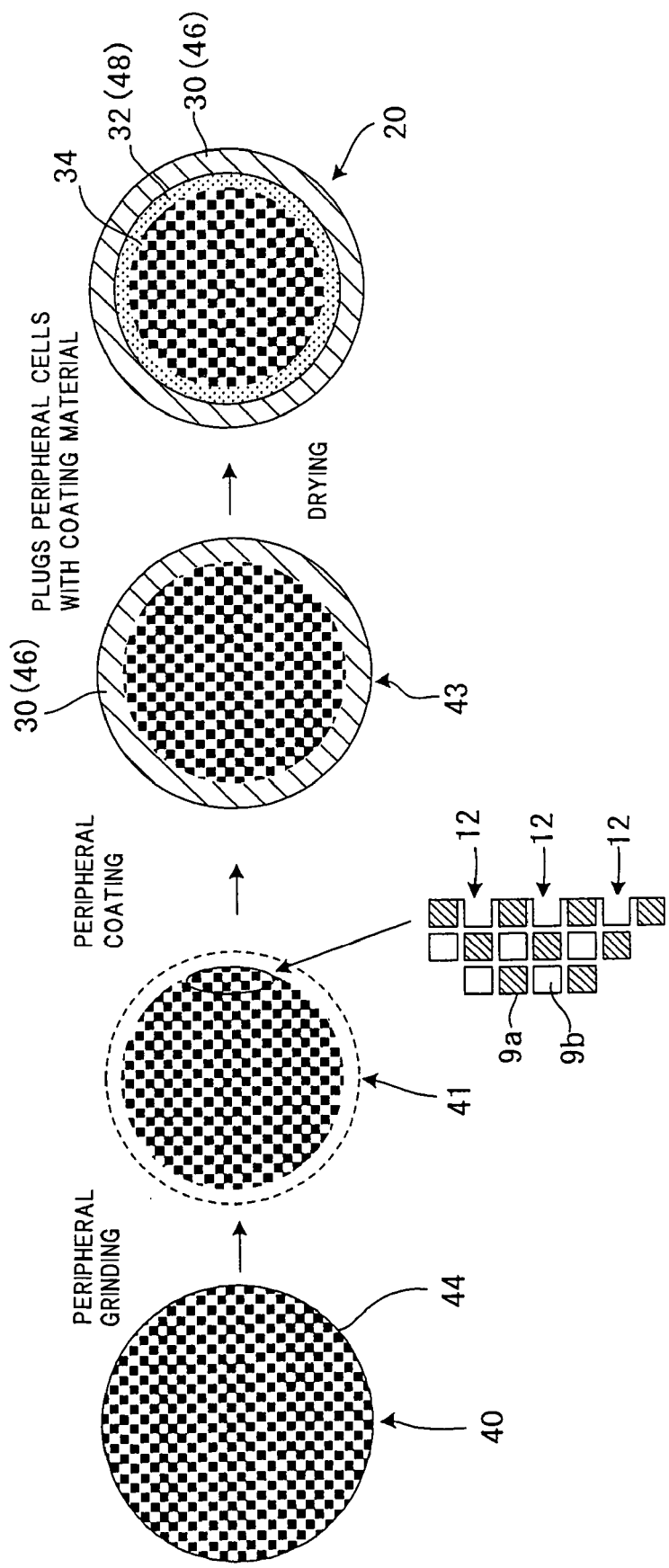
FIGS. 7(a) to (d) are an explanatory diagram illustrative of a method of manufacturing the honeycomb structure of the present invention.
Figure 8:
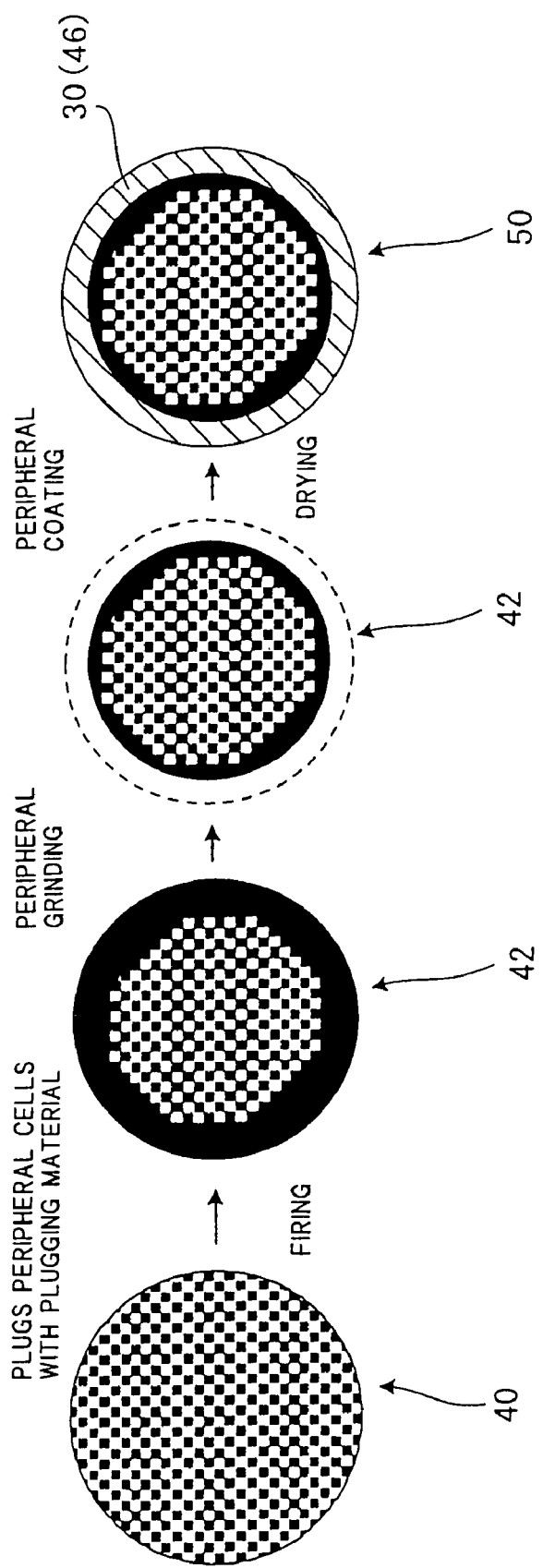
FIGS. 8(a) to (d) are an explanatory diagram illustrative of a conventional method of manufacturing a honeycomb structure.

In the honeycomb structure of the present invention, as shown in FIG. 6, the second plugging portion, that is, the peripheral plugging portion 32 may be mainly formed in the ranges of $\theta_1$: 10 to 80°, $\theta_2$: 100 to 170°, $\theta_3$: 190 to 260°, and $\theta_4$: 280 to 350° based on the axis which passes through the align of the honeycomb structure and intersects the partition walls at right angles.

Since cracks originating from the peripheral portion occur in the area at 45° with respect to the direction which intersects the cells at right angles, the strength is increased by providing the second plugging portion in these areas, whereby occurrence of cracks is prevented. Therefore, the effect of preventing an increase in pressure loss can be obtained while maintaining the heat insulating effect and the effect of preventing cracks occurring from the peripheral portion by selectively providing the second plugging portion in these areas.

The material containing ceramics (coating material) usable in the present invention is described below in detail. As shown in FIG. 1(b), the material containing ceramics (coating material) is used in the present invention to form the peripheral plugging portion 32 and the outer wall 30 disposed at the periphery of the filter section 34, and generally includes a filler and an inorganic binder which binds the filler. As the filler, particulate cordierite (fired powder) having a small coefficient of thermal expansion and showing no change in crystal phase due to heat history is advantageously used. This allows the peripheral plugging portion 32 and the outer wall 30 to have a main crystal phase including cordierite.

The reason that cordierite is preferable as the filler is as follows. Specifically, a thermal stress occurs in each section during heating and cooling of the honeycomb structure, and such a thermal stress is concentrated at the interface between the filter section 34 and the peripheral plugging portion 32 and the outer wall 30. The thermal stress is minimized if the thermal expansion of the peripheral plugging portion 32 and the outer wall 30 is the same as the thermal expansion of the filter section 34. In the case where the peripheral plugging portion 32 and the outer wall 30 differ in thermal expansion from the filter section, problems such as occurrence of cracks in the peripheral plugging portion 32 and the outer wall 30 due to the thermal stress can be effectively reduced if the thermal expansion of the outer layer is smaller. Therefore, since it is effective to reduce the thermal expansion of the filler in comparison with the matrix formed by the inorganic binder having a large thermal expansion in order to reduce the thermal expansion of the peripheral plugging portion 32 and the outer wall 30, cordierite exhibiting a small thermal expansion is advantageously used as the filler. This reduces the thermal expansion of the peripheral plugging portion 32 and the outer wall 30, whereby a honeycomb structure exhibiting excellent thermal stress resistance can be obtained.

Cordierite used as the filler is generally a fired powder having an average particle size of 50 μm or less. In particular, cordierite having a bimodal particle size distribution formed of a blend of cordierite having a small average particle size and cordierite having a comparatively large average particle size, such as a mixture of cordierite having an average particle size of 15 μm or less and cordierite having an average particle size of 30 μm or more is advantageously used. Occurrence of cracks in the peripheral plugging portion 32 and the outer wall 30 is advantageously prevented by using ceramic fibers formed of amorphous mullite, amorphous silica-alumina, or the like as a part of the filler instead of cordierite particles, whereby separation or the like is effectively prevented. As the ceramic fibers, a ceramic fiber having a fiber length of about 10 to 15 μm and a fiber diameter of about 2 to 3 μm is advantageously used.

The matrix formed of the inorganic binder which binds the filler such as cordierite particles and ceramic fibers and forms the peripheral plugging portion 32 and the outer wall 30 is generally an amorphous oxide matrix, which is advantageously formed by using colloidal silica or colloidal alumina as the inorganic binder. In the present invention, a conventional inorganic binder such as water glass or alumina cement may also be used. However, the heat resistant characteristics of the peripheral plugging portion 32 and the outer wall 30 formed at the periphery of the filter section 34 and the thermal impact resistant characteristics of the resulting honeycomb structure 20 can be advantageously improved by using colloidal silica or colloidal alumina as the inorganic binder.

In the case of using the colloidal oxide such as colloidal silica or colloidal alumina as the inorganic binder, it is preferable to incorporate the colloidal oxide in an amount of 3 to 35 parts by weight (solid content) for 100 parts by weight of cordierite particles and/or ceramic fibers. In order to secure the strength of the peripheral plugging portion 32 and the outer wall 30 and to sufficiently bond cordierite particles or ceramic fibers as the filler, it is necessary to use the colloidal oxide in an amount of 3 parts by weight or more. If the amount is too great, the thermal characteristics of the peripheral plugging portion 32 and the outer wall 30 and the thermal characteristics of the honeycomb structure deteriorate.

When manufacturing the ceramic honeycomb structure according to the present invention, a coating material including the above cordierite particles and/or ceramic fibers and the colloidal oxide as the major components is advantageously used. The outer layer of the honeycomb structure which is the peripheral wall section is formed by using the coating material. An appropriate adjuvant such as a viscosity controller such as an organic binder may be arbitrarily incorporated into the coating material taking into consideration the workability of coating the honeycomb structure with the coating material.

The cross-sectional shape of the circulation hole (cell shape) of the honeycomb structure of the present invention is not particularly limited. From the viewpoint of manufacture, the cross-sectional shape of the circulation hole may be a triangle, quadrangle, hexagon, octagon, or circle, a shape obtained by combining these shapes, or a polygon such as an ellipse, oval, approximate triangle, or approximate quadrangle.

The material for the honeycomb structure of the present invention preferably includes one material selected from the group consisting of cordierite, silicon carbide, alumina, mullite, aluminum titanate, and lithium aluminum silicate (LAS) as the main crystal phase from the viewpoint of strength, heat resistance, and the like. It is preferable that the plugging material be the same as the material for the honeycomb structure, since this allows the plugging portion and the honeycomb structure to have the same coefficient of thermal expansion.

The application of the honeycomb structure of the present invention is not particularly limited. However, it is preferable to use the honeycomb structure of the present invention as a filter in which partition walls partitioning cells (circulation holes) have filtration capability and which traps and removes particulates (particulate matter) contained in dust-containing fluid such as exhaust gas discharged from an internal combustion engine as described above in order to allow the honeycomb structure to exhibit its characteristics.

A method of manufacturing the honeycomb structure of the present invention is described below with reference to FIGS. 7(a) to (d).

In the method of manufacturing the honeycomb structure of the present invention, the honeycomb structure is mainly manufactured by steps (1) to (4).

(1) The first plugging portions are provided to a honeycomb formed product (not shown), in which a plurality of cells communicating between two open ends are partitioned and formed by porous partition walls, in a checkered flag pattern at one end and the other end of the honeycomb formed product so that either of the two open ends of each cell is plugged with a plugging material, alternately, and firing the honeycomb formed product to obtain a honeycomb structure 40.

(2) The periphery of the resulting honeycomb structure 40 is ground to predetermined outer dimensions so that, among the cells extending in the axial direction, enclosed by the partition walls 7, and partitioned from one another, the cells located in the outermost peripheral portion do not have the partition wall 7 which faces the outside to form grooves 12 open to the outside and extending in the axial direction. Specifically, the cell curved section does not exist in the peripheral portion by grinding a periphery 44 of the honeycomb structure obtained in the step (1) integrally having the periphery wall in the step (2), whereby a peripherally-ground honeycomb structure 41 which does not have a section of the honeycomb structure 20 exhibiting the lowest mechanical strength can be obtained.

(3) At least the grooves 12 in the peripheral portion of the peripherally-ground honeycomb structure 41 are filled with a material containing ceramics (coating material) 46, and the material 46 is dried to form the outer wall 30 with predetermined outer dimensions and dimensional accuracy. This enables the isostatic strength of a honeycomb structure 43 on which the outer wall is formed to be effectively improved, whereby a decrease in strength during use due to separation of the outer wall can be prevented, and a decrease in honeycomb thermal shock resistance occurring when reinforcing the honeycomb structure 41 can be effectively prevented.

(4) Among the two open ends 3 and 5 of the outermost peripheral cells 23 located at the outermost periphery of the honeycomb structure 43 on which the outer wall is formed and the peripheral cells 24 located inward from the outermost peripheral cells 23 within a range of a predetermined number of cells, at least a part of the open ends 3 and 5 which are not provided with the first plugging portion 25 is filled with a material containing ceramics (coating material) 48, and the material 48 is dried to form the second plugging portions 26 (see FIGS. 1(a) and 1(b)).

As described above, according to the method of manufacturing the honeycomb structure of the present invention (see FIGS. 7(a) to (d)), since aligning during peripheral grinding is facilitated in comparison with a conventional method of manufacturing a honeycomb structure (see FIGS. 8(a) to (d)), and the peripheral portion of the honeycomb structure in the diametrical direction can be formed to conform to the design, the yield of the honeycomb structure is significantly improved. Moreover, since the peripheral portion of the honeycomb structure in the diametrical direction can be plugged without firing, the manufacturing cost can be significantly reduced.

EXAMPLES

The present invention is described below in more detail based on examples. However, the present invention is not limited the following examples.

Comparative Examples 1 to 5

Figure 9:
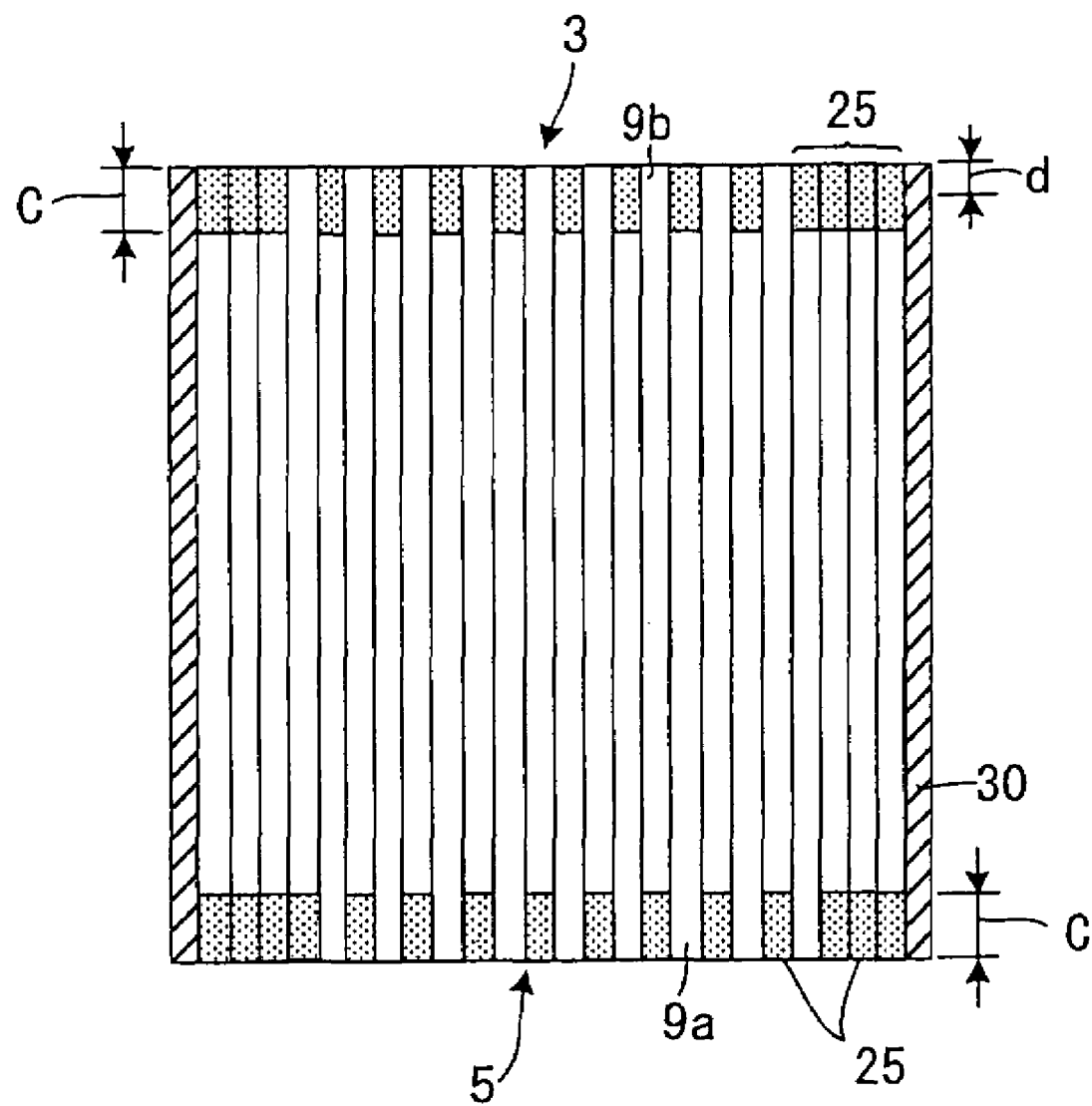
FIG. 9 is a vertical cross-sectional view showing an example of a conventional honeycomb structure.
Figure 10A:
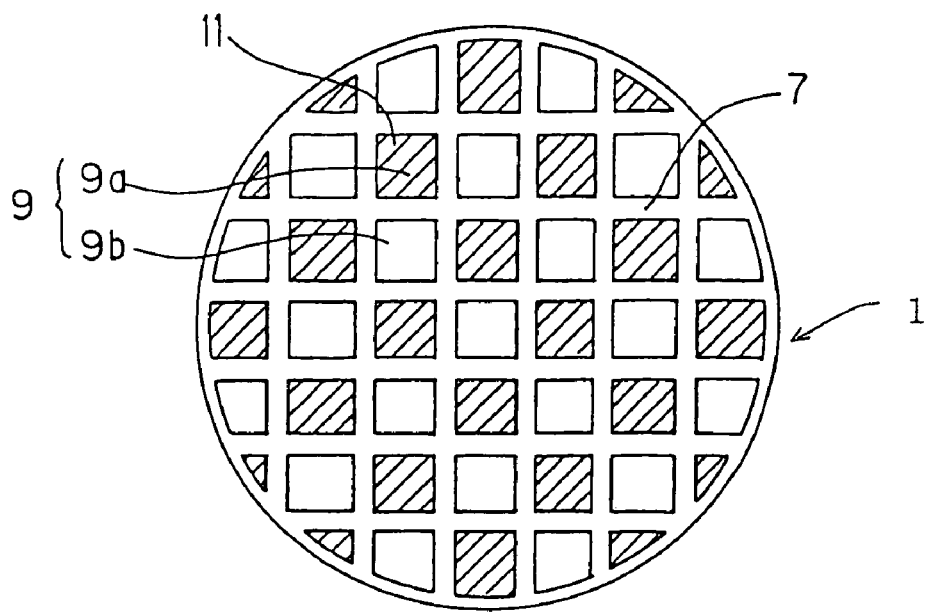
FIG. 10(a) is a plan view from one end face and FIG. 10(b) is a cross-sectional view.
Figure 10B:
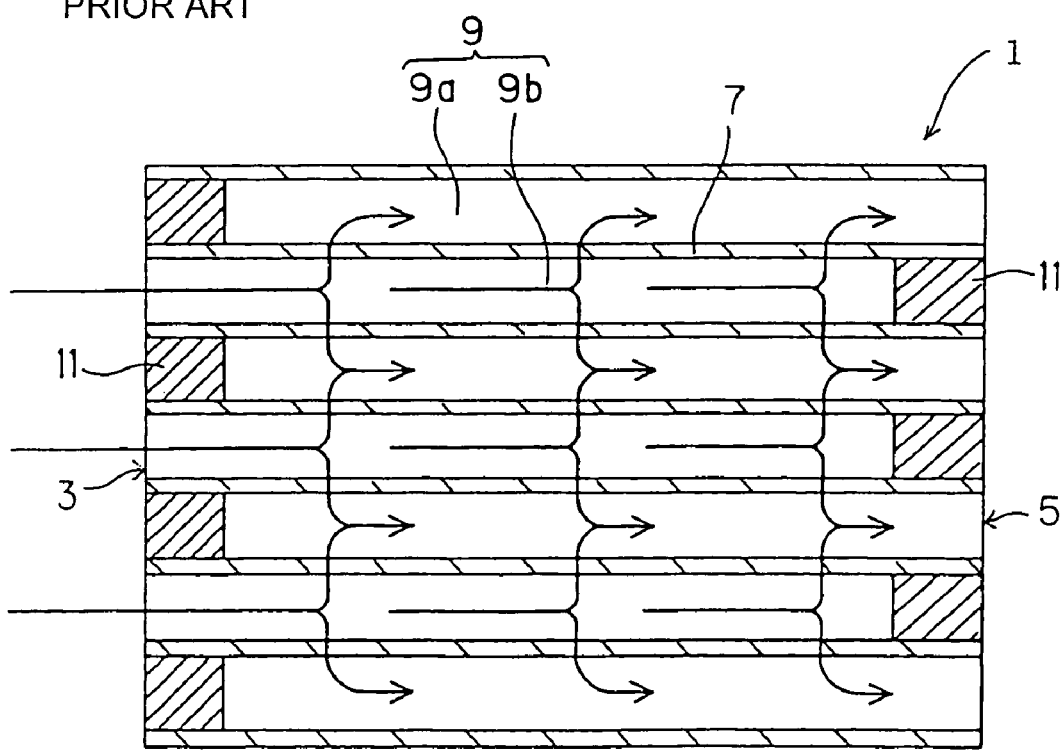

A honeycomb formed product having a diameter of 206 mm, a length of 178 mm, a partition wall thickness of 0.3 mm, and a cell density of 46 per $cm^2$, of which the raw materials were adjusted so that the porosity after firing was 65%, was provided with plugging portions in a checkered flag pattern at one end and the other end of the honeycomb formed product, alternately. Then, the peripheral portion of the honeycomb formed product in the diametrical direction was plugged with a plugging material to a length "c" of 3 mm (see FIG. 9) over 10 cells inward from the periphery. After firing the honeycomb formed product at a high temperature, the honeycomb formed product was ground so that the outer diameter was 191 mm and coated with a coating material to obtain five honeycomb structures 50 (DPF) (see FIGS. 8(a) to (d)).

Examples 1 to 5

A honeycomb formed product having a diameter of 206 mm, a length of 178 mm, a partition wall length of 0.3 mm, and a cell density of 46 per $cm^2$, of which the raw materials were adjusted so that the porosity after firing was 65%, was provided with plugging portions in a checkered flag pattern at one end and the other end of the honeycomb formed product, alternately. The honeycomb formed product was (1) fired at a high temperature, (2) ground so that the outer diameter was 191 mm, (3) coated peripheral portion with coating material, and (4) plugged with a coating material to a length "c" of 3 mm (see FIG. 2) at each end face of the peripheral portion over five cells inward from the periphery, and dried to obtain five honeycomb structures 20 (DPF) (see FIGS. 7(*a*) to (*d*)).

Table 1 shows the measurement results for the number of plugged peripheral cells of the above two types of DPFs in the directions which intersect the cells at right angles (0°, 90°, 180°, and 270° directions (see FIG. 6)).

TABLE 1

|  | Number of plugged cells | | | |
|---|---|---|---|---|
|  | 0° | 90° | 180° | 270° |
| Comparative Example 1 | 3 | 3 | 7 | 7 |
| Comparative Example 2 | 3 | 1 | 7 | 9 |
| Comparative Example 3 | 5 | 3 | 5 | 7 |
| Comparative Example 4 | 7 | 3 | 3 | 7 |
| Comparative Example 5 | 5 | 2 | 5 | 8 |
| Example 1 | 5 | 5 | 5 | 5 |
| Example 2 | 5 | 5 | 5 | 5 |
| Example 3 | 5 | 5 | 5 | 5 |
| Example 4 | 5 | 5 | 5 | 5 |
| Example 5 | 5 | 5 | 5 | 5 |

From the results shown in Table 1, although the number of plugged cells varies in Comparative Examples 1 to 5 depending on the direction, the variation was not observed in Examples 1 to 5. Therefore, the honeycomb structure of the present invention could be accurately plugged in the peripheral portion.

Examples 6 to 10 and Comparative Examples 6 and 7

A DPF manufactured in the same manner as in Example 1 except that the peripheral portion was not plugged with the second plugging material, and DPFs manufactured in the same manner as in Example 1 except that the number of cells plugged with the coating material at each end face of the peripheral portion was changed to three cells, five cells, seven cells, 10 cells, 13 cells, and 16 cells inward from the periphery were provided (specimens 1 to 7). The DPF specimens 1 to 7 were subjected to measurement of pressure loss in the case where air at room temperature was caused to flow (flow rate: 9 Nm³/min) in a state in which particulates were not deposited and pressure loss in the case where air at 200° C. was caused to flow (flow rate: 5 Nm³/min) in a state in which 5 g/L of particulates were deposited. The test results are shown in FIGS. 11 and 12.

Figure 11:
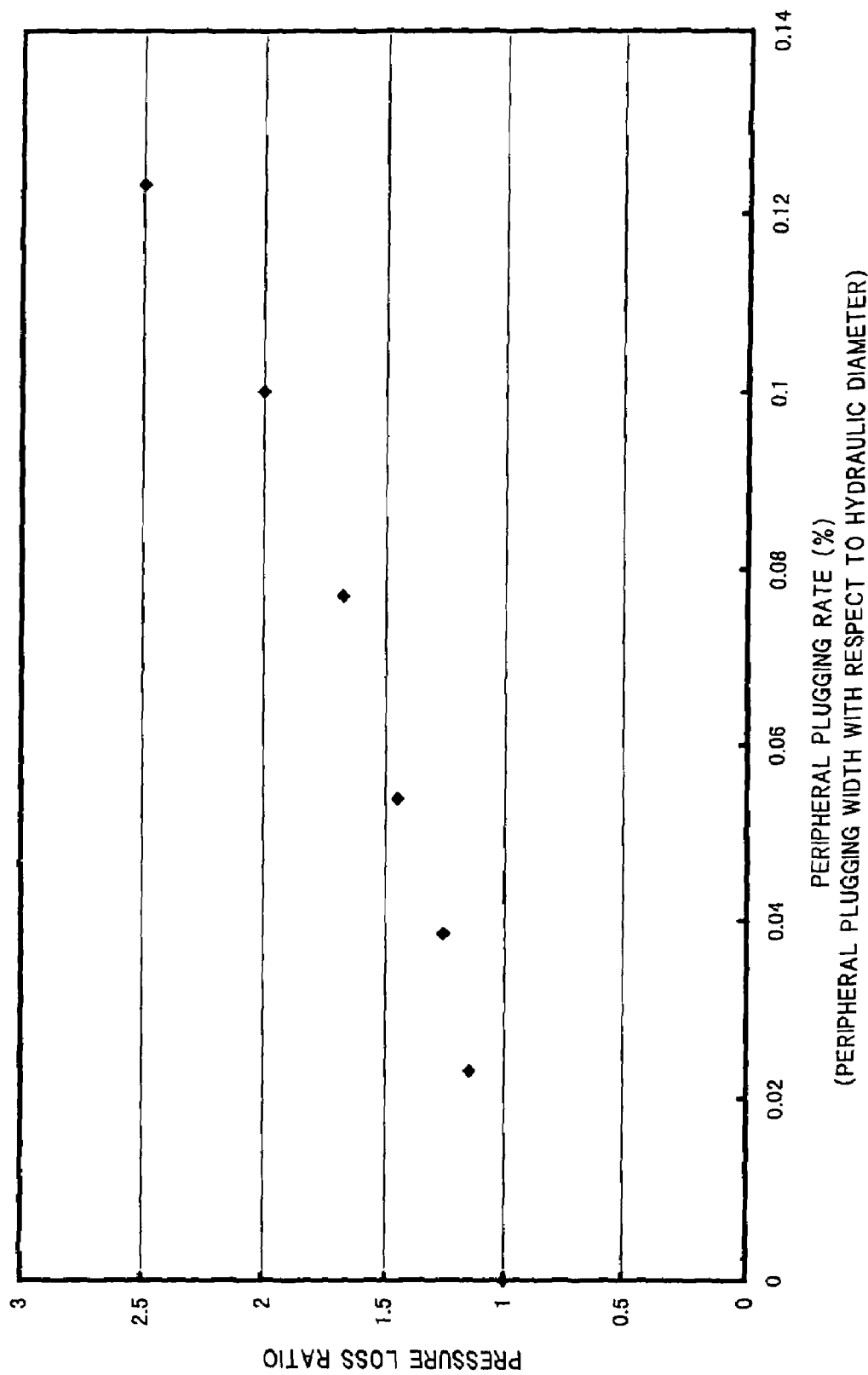
FIG. 11 is a graph showing a change in pressure loss with respect to the peripheral plugging rate of a DPF in the case where air at room temperature is caused to flow in a state in which particulates are not deposited.
Figure 12:
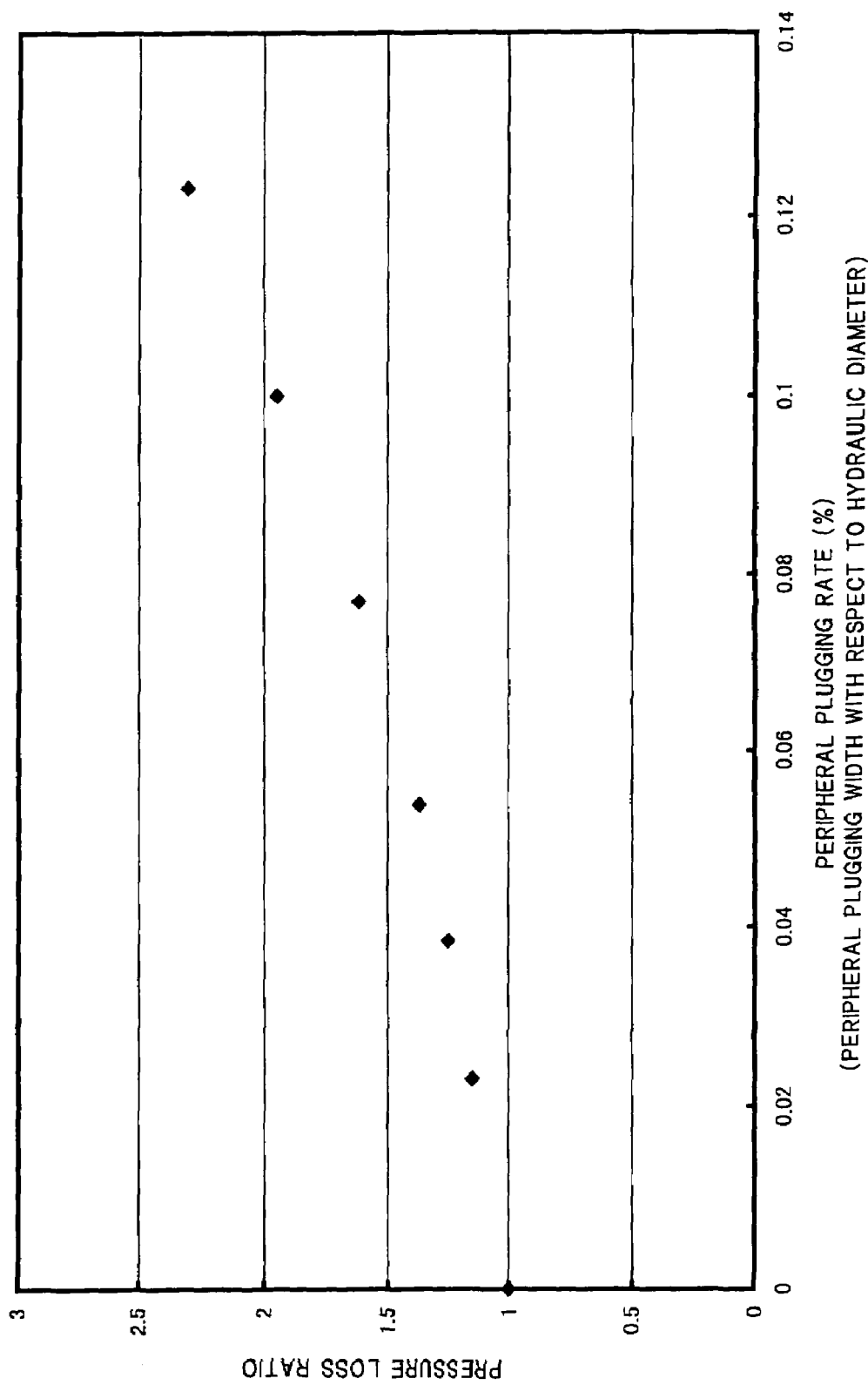
FIG. 12 is a graph showing a change in pressure loss with respect to the peripheral plugging rate of a DPF in the case where air at 200° C. is caused to flow in a state in which 5 g/L of particulates are deposited.

From the results shown in FIGS. 11 and 12, when the plugging length using the coating material exceeds 10% of the hydraulic diameter defined by the equation (1), the pressure loss is increased to twice or more of the initial value in the case where particulates are not deposited (FIG. 11) and the case where 5 g/L of particulates are deposited to increase fuel consumption. Therefore, such a plugging length is impractical.

The DPF specimens 1 to 7 were installed in an exhaust system of a common-rail direct-injection diesel engine with a displacement of four liters, and subjected to 100 cycles of trapping 20 g of particulates and regenerating the specimen, and the particulate unburned state in the peripheral portion at the DPF inflow end face was observed. Table 2 shows the naked-eye observation results for the particulate unburned state after conducting the test. From the results shown in Table 2, it was found that particulates remain unburned at the inflow end face if the plugging length using the coating material is less than 2% of the hydraulic diameter defined by the equation (1) (Comparative Example 6).

TABLE 2

| Specimen | | Plugging width (cell) | Ratio to hydraulic diameter (%) | Presence or absence of unburned particulate |
|---|---|---|---|---|
| Comparative Example 6 | 1 | 0 | 0 | Present |
| Example 6 | 2 | 3 | 2 | Present to some extent |
| Example 7 | 3 | 5 | 4 | Absent |
| Example 8 | 4 | 7 | 5 | Absent |
| Example 9 | 5 | 10 | 8 | Absent |
| Example 10 | 6 | 13 | 10 | Absent |
| Comparative Example 7 | 7 | 16 | 12 | Absent |

Therefore, it is preferable to provide the second plugging portion in the peripheral portion at a length of 2 to 10% of the hydraulic diameter of the honeycomb structure defined by the equation (1).

Examples 11 to 13 and Comparative Examples 8 and 9

DPFs manufactured in the same manner as in Example 1 except that the length "c" of the coating material for plugging the inflow peripheral portion was changed to 5 mm, 4 mm, 1 mm, and 0.5 mm (see FIG. 3) were provided (specimens 8 to 11). The DPF specimen of Example 1 (see FIG. 2) and the DPF specimens 8 to 11 were installed in an exhaust system of a common-rail direct-injection diesel engine in the same manner as described above, and subjected to 100 cycles of trapping 20 g of particulates and regenerating the specimen, and the particulate unburned state in the peripheral portion at the DPF inflow end face was observed. Table 3 shows the particulate unburned state after conducting the test.

TABLE 3

| | Specimen | Plugging length (mm) | Presence or absence of unburned particulate |
|---|---|---|---|
| Comparative Example 8 | 8 | 5 | Present |
| Comparative Example 9 | 9 | 4 | Present to some extent |
| Example 11 | Example 1 | 3 | Absent |
| Example 12 | 10 | 1 | Absent |
| Example 13 | 11 | 0.5 | Absent |

From the results shown in Table 3, it was found that particulates remain unburned at the inflow end face if the cell plugging length using the coating material exceeds 3 mm (Comparative Examples 8 and 9). It is considered that this results from a phenomenon in which the particulate combustion temperature is not reached during regeneration due to an increase in heat capacity if the length of the plugging of the peripheral cells plugged with the coating material exceeds 3 mm.

Examples 14 to 16 and Comparative Examples 10 and 11

DPFs manufactured in the same manner as in Example 1 except that the length "c" of the coating material for plugging the outflow peripheral portion was changed to 3 mm, 5 mm, 10 mm, and 15 mm and a DPF in which the peripheral portion at the each end face was not plugged with the coating material were provided (specimens 12 to 16). The DPF specimens 12 to 16 were installed in an exhaust system of a common-rail direct-injection diesel engine and subjected to regeneration in a state in which 5 g/L of particulates were trapped, and the temperature inside the DPF was measured using a thermocouple. In this case, the engine speed was set at 1700 rpm until regeneration started, and the engine speed was decreased to the idle engine speed when regeneration started. The start of regeneration was detected by always measuring the pressure loss of the DPF, and taking the time at which the pressure loss started to decrease as the start of regeneration.

Figure 13:
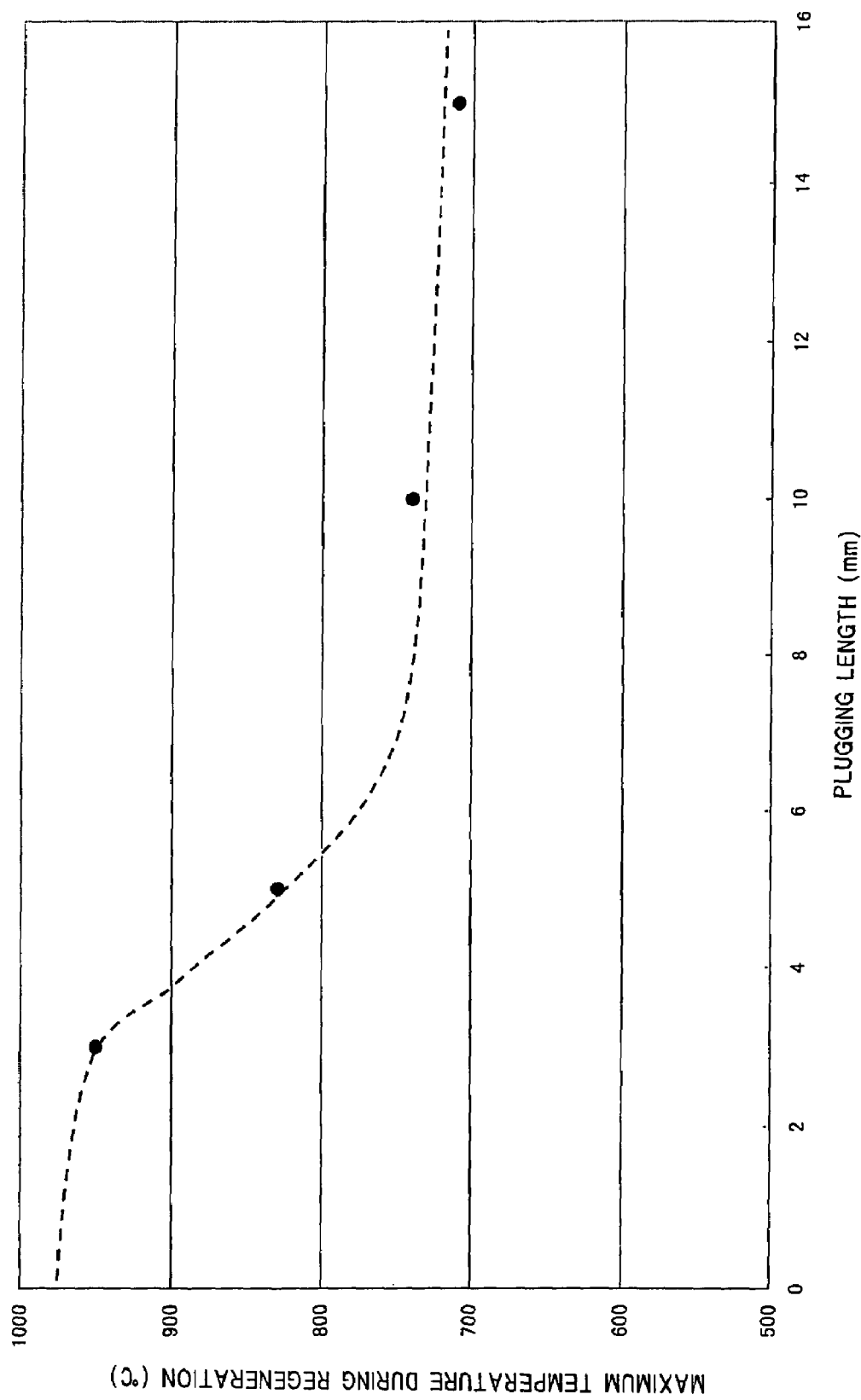
FIG. 13 is a graph showing a change in maximum temperature during DPF regeneration with respect to the plugging length in the outflow peripheral portion of a DPF during regeneration.

The test results are shown in FIG. 13. From the results shown in FIG. 13, an increase in temperature on the outflow side is prevented during regeneration when the plugging length using the coating material is 5 mm or more.

The honeycomb structure of the present invention and the method of manufacturing the same can be suitably used for a filter for trapping particles contained in exhaust gas from an internal combustion engine, boiler, or the like.

What is claimed is:

1. A honeycomb structure, comprising: a cell structure having a plurality of cells communicating between two open ends and being formed by having been partitioned by porous partition walls; an outer wall provided at a periphery of the cell structure; and first plugging portions provided in a checkered flag pattern at one end and the other end of the cell structure to plug either of the two open ends of the cells alternately; through which a fluid flowing from open ends thereof and penetrating the porous partition walls into the neighboring cells whose other ends are open and flowing out from the other open ends as a filtered fluid; and second plugging portions; the first plugging portions being fired after plugging but the second plugging portions being unfired even after plugging.

2. The honeycomb structure according to claim 1, wherein the second plugging portions are provided in such manner that a part of the face of at least one end out of two open ends of the cells located at an outermost peripheral portion of the structure and those located inwardly within a predetermined number counting from the outermost peripheral cell, and to which the first plugging portions are not provided is plugged thereby.

3. The honeycomb structure according to claim 2, wherein a distance from the outermost peripheral cell to a peripheral cell to which the second plugging portions are formed is 2 to 10% of a hydraulic diameter of the honeycomb structure defined by the following equation (1):

$$HD = 4S/L \qquad (1)$$

wherein HD means hydraulic diameter, S means cross-sectional area of honeycomb structure perpendicular to gas passage direction, and L means circumference of cross section of honeycomb structure perpendicular to gas passage direction.

4. The honeycomb structure according to claim 1, wherein a length of the second plugging portion being formed on one end face of the cell among two ends of the structure is shorter than that of the first plugging portion.

5. The honeycomb structure according to claim 4, wherein the length of the second plugging portion is 0.5 to 3.0 mm.

6. The honeycomb structure according to claim 1, wherein a length of the second plugging portion being formed on other end face of the cell among two ends of the structure from its end face is longer than that of the first plugging portion.

7. The honeycomb structure according to claim 4, wherein a length of the second plugging portion being formed on other end face of the cell among two ends of the structure from its end face is longer than that of the first plugging portion.

8. The honeycomb structure according to claim 6, wherein the length of the second plugging portion is 5.0 mm or more.

9. The honeycomb structure according to claim 7, wherein the length of the second plugging portion is 5.0 mm or more.

10. The honeycomb structure according to claim 1, wherein at least one of the outer wall and the second plugging portion of the honeycomb structure is formed of a material containing ceramics.

11. The honeycomb structure according to claim 1, comprising a protrusion formed of a material containing ceramics and peripherally provided to the honeycomb structure on a position of at least one of end faces extending from the outer wall to the peripheral cells of the honeycomb structure.

12. The honeycomb structure according to claim 11, wherein a vertical cross-sectional shape of the protrusion is a tapered shape or a round head shape.

13. The honeycomb structure according to claim 1, wherein the second plugging portions are mainly formed in ranges of 10 to 80°, 100 to 170°, 190 to 260°, and 280 to 350° based on an axis which passes through a center of the honeycomb structure and intersects the partition walls at right angles.

14. The honeycomb structure according to claim 3, wherein the second plugging portions are mainly formed in ranges of 10 to 80°, 100 to 170°, 190 to 260°, and 280 to 350° based on an axis which passes through a center of the honeycomb structure and intersects the partition walls at right angles.

15. The honeycomb structure according to claim 1, wherein a cross-sectional shape of the cell is a triangle, quadrangle, hexagon, octagon, or circle, or a shape obtained by combining these shapes.

16. The honeycomb structure according to claim 1 which includes one material selected from the group consisting of cordierite, silicon carbide, silicon nitride, alumina, mullite, aluminum titanate, and LAS as a main crystal phase.

17. A method of manufacturing a honeycomb structure which comprises the steps of:
providing a first plugging portion to a honeycomb formed product, in which a plurality of cells communicating between two open ends are partitioned and formed by porous partition walls, in a checkered flag pattern at one end and the other end of the honeycomb formed product so that either of the two open ends of each of the cells is plugged with a plugging material, alternately,
firing the honeycomb formed product to obtain a honeycomb structure; grinding a periphery of the honeycomb structure to a predetermined outer dimension to form grooves open to the outside and extending in the axial direction by removing an outer portion of partition walls of the outermost peripheral cells which faces to outside;
filling at least thus formed grooves of the honeycomb structure with a material containing ceramics to form an outer wall to have a predetermined outer dimension; and
filling at least a part of the open ends of the cells located at an outermost peripheral portion of the structure and located inwardly from the outermost peripheral cell at a position within a predetermined number of cells counting therefrom, and to which the first plugging portions are not provided is plugged thereby, and
drying the material used for plugging to form a second plugging portion; said second plugging portion being unfired.

18. The method of manufacturing a honeycomb structure according to claim 17, wherein the material containing at least one ceramic material selected from the group consisting of cordierite particles, ceramic fibers and an amorphous oxide matrix present between cordierite particles and/or ceramic fibers.

19. The method of manufacturing a honeycomb structure according to claim 18, wherein the amorphous oxide matrix is a matrix formed of colloidal silica or colloidal alumina.

20. The method of manufacturing a honeycomb structure according to claim 17, wherein the honeycomb structure includes one material selected from the group consisting of cordierite, silicon carbide, silicon nitride, alumina, mullite, aluminum titanate, and LAS as a main crystal phase.

* * * * *